(12) United States Patent
Tilly et al.

(10) Patent No.: US 8,489,489 B2
(45) Date of Patent: Jul. 16, 2013

(54) SYSTEM AND METHOD FOR TRADING DERIVATIVES IN PENNY INCREMENTS WHILE DISSEMINATING QUOTES FOR DERIVATIVES IN NICKEL/DIME INCREMENTS

(75) Inventors: Edward T. Tilly, Barrington, IL (US); Christopher Gust, Chicago, IL (US)

(73) Assignee: Chicago Board Options Exchange, Incorporated, Chicago, IL (US)

( * ) Notice: Subject to any disclaimer, the term of this patent is extended or adjusted under 35 U.S.C. 154(b) by 461 days.

(21) Appl. No.: 11/416,711

(22) Filed: May 3, 2006

(65) Prior Publication Data

US 2006/0293998 A1    Dec. 28, 2006

Related U.S. Application Data

(60) Provisional application No. 60/678,267, filed on May 5, 2005.

(51) Int. Cl.
 *G06Q 40/00* (2012.01)
(52) U.S. Cl.
 USPC ............... 705/37; 705/35; 705/36; 705/39; 705/44
(58) Field of Classification Search
 USPC ............................................ 705/15–45
 See application file for complete search history.

(56) References Cited

U.S. PATENT DOCUMENTS

| | | | |
|---|---|---|---|
| 3,573,747 A | 4/1971 | Adams et al. | |
| 3,581,072 A | 5/1971 | Nymeyer | |
| 4,412,287 A | 10/1983 | Braddock, III | |
| 4,674,044 A | 6/1987 | Kalmus et al. | |
| 4,903,201 A | 2/1990 | Wagner | |
| 4,980,826 A | 12/1990 | Wagner | |
| 5,038,284 A | 8/1991 | Kramer | |
| 5,101,353 A | 3/1992 | Lupien et al. | |
| 5,136,501 A | 8/1992 | Silverman et al. | |
| 5,297,031 A | 3/1994 | Gutterman et al. | |
| 5,297,032 A | 3/1994 | Trojan et al. | |
| 5,305,200 A | 4/1994 | Hartheimer et al. | |
| 5,315,634 A | 5/1994 | Tanaka et al. | |

(Continued)

FOREIGN PATENT DOCUMENTS

| | | |
|---|---|---|
| EP | 0 752 135 | 2/1999 |
| EP | 0 952 536 A1 | 10/1999 |

(Continued)

OTHER PUBLICATIONS

Federal Register, vol. 68, No. 77, Apr. 22, 2003.*

(Continued)

*Primary Examiner* — Hai Tran
(74) *Attorney, Agent, or Firm* — Brinks Hofer Gilson & Lione

(57) ABSTRACT

A system and method for trading derivatives in penny increments while disseminating quotes for derivatives in nickel/dime increments is disclosed. A trading engine receives quotes for a derivative in penny increments from at least one entity. The trading engine rounds out the quotes for the derivative in penny increments to quotes for the derivative in nickel/dime increments. The quotes in nickel/dime increments are aggregated and disseminated. The trading engine receives bids and offers to take positions in the derivative based on the aggregate quotes for the derivative in nickel/dime increments and executes trades for the derivative by matching bids and offers to buy and sell positions in the derivative.

20 Claims, 2 Drawing Sheets

U.S. PATENT DOCUMENTS

| | | |
|---|---|---|
| 5,557,517 A | 9/1996 | Daughterty, III |
| 5,664,115 A | 9/1997 | Fraser |
| 5,689,652 A | 11/1997 | Lupien et al. |
| 5,715,402 A | 2/1998 | Popolo |
| 5,744,877 A | 4/1998 | Owens |
| 5,774,877 A | 6/1998 | Patterson, Jr. et al. |
| 5,787,402 A | 7/1998 | Potter et al. |
| 5,793,301 A | 8/1998 | Patterson, Jr. et al. |
| 5,797,002 A | 8/1998 | Patterson, Jr. et al. |
| 5,809,483 A | 9/1998 | Broka et al. |
| 5,813,009 A | 9/1998 | Johnson et al. |
| 5,819,237 A | 10/1998 | Garman |
| 5,845,266 A | 12/1998 | Lupien et al. |
| 5,873,071 A | 2/1999 | Ferstenberg et al. |
| 5,905,974 A | 5/1999 | Fraser et al. |
| 5,913,202 A | 6/1999 | Motoyama |
| 5,915,209 A | 6/1999 | Lawrence |
| 5,915,245 A | 6/1999 | Patterson, Jr. et al. |
| 5,924,082 A | 7/1999 | Silverman et al. |
| 5,950,176 A | 9/1999 | Keiser et al. |
| 5,950,177 A | 9/1999 | Lupien et al. |
| 5,963,923 A | 10/1999 | Garber |
| 5,970,479 A | 10/1999 | Shepherd |
| 5,978,779 A | 11/1999 | Stein et al. |
| 6,012,046 A | 1/2000 | Lupien et al. |
| 6,014,627 A | 1/2000 | Togher et al. |
| 6,014,643 A | 1/2000 | Minton |
| 6,016,483 A | 1/2000 | Rickard et al. |
| 6,018,722 A | 1/2000 | Ray et al. |
| 6,021,397 A | 2/2000 | Jones et al. |
| 6,035,288 A | 3/2000 | Solomon |
| 6,076,068 A | 6/2000 | DeLapa et al. |
| 6,119,103 A | 9/2000 | Basch et al. |
| 6,195,647 B1 | 2/2001 | Martyn et al. |
| 6,199,050 B1 | 3/2001 | Alaia et al. |
| 6,230,146 B1 | 5/2001 | Alaia et al. |
| 6,247,000 B1 | 6/2001 | Hawkins et al. |
| 6,263,321 B1 | 7/2001 | Daughtery, III |
| 6,266,651 B1 | 7/2001 | Woolston |
| 6,269,346 B1 | 7/2001 | Cristofich et al. |
| 6,272,474 B1 | 8/2001 | Garcia |
| 6,278,982 B1 | 8/2001 | Korhammer et al. |
| 6,282,521 B1 | 8/2001 | Howorka |
| 6,285,989 B1 | 9/2001 | Shoham |
| 6,317,727 B1 | 11/2001 | May |
| 6,317,728 B1 | 11/2001 | Kane |
| 6,321,212 B1 | 11/2001 | Lange |
| 6,377,940 B2 | 4/2002 | Tilfors et al. |
| 6,405,180 B2 | 6/2002 | Tilfors et al. |
| 6,421,653 B1 | 7/2002 | May |
| 6,493,682 B1 | 12/2002 | Horrigan et al. |
| 6,505,174 B1 | 1/2003 | Keiser et al. |
| 6,505,175 B1 | 1/2003 | Silverman et al. |
| 6,539,362 B1 | 3/2003 | Patterson, Jr. et al. |
| 6,560,580 B1 | 5/2003 | Fraser et al. |
| 6,564,192 B1 | 5/2003 | Kinney, Jr. et al. |
| 6,601,627 B2 | 8/2003 | Kasai et al. |
| 6,618,707 B1 | 9/2003 | Gary |
| 6,647,374 B2 | 11/2003 | Kansal |
| 7,039,610 B2 | 5/2006 | Morano et al. |
| 7,047,218 B1 * | 5/2006 | Wallman .................... 705/36 R |
| 7,085,738 B2 | 8/2006 | Tarrant |
| 7,099,839 B2 | 8/2006 | Madoff et al. |
| 7,225,153 B2 | 5/2007 | Lange |
| 7,233,922 B2 | 6/2007 | Asher et al. |
| 7,246,093 B1 * | 7/2007 | Katz ............................... 705/37 |
| 7,260,554 B2 | 8/2007 | Morano et al. |
| 7,296,025 B2 | 11/2007 | Kung et al. |
| 7,333,950 B2 | 2/2008 | Shidler et al. |
| 7,389,264 B2 | 6/2008 | Kemp, II et al. |
| 2002/0002530 A1 | 1/2002 | May |
| 2002/0013760 A1 | 1/2002 | Arora et al. |
| 2002/0019799 A1 | 2/2002 | Ginsberg et al. |
| 2002/0032629 A1 | 3/2002 | Siegel, Jr. et al. |
| 2002/0052816 A1 | 5/2002 | Clenaghan et al. |
| 2002/0082967 A1 | 6/2002 | Kaminsky et al. |
| 2002/0087365 A1 | 7/2002 | Kavanaugh |
| 2002/0099640 A1 | 7/2002 | Lange |
| 2002/0103738 A1 | 8/2002 | Griebel |
| 2002/0128952 A1 | 9/2002 | Melkomian et al. |
| 2002/0138401 A1 | 9/2002 | Allen et al. |
| 2002/0147670 A1 | 10/2002 | Lange |
| 2002/0152152 A1 | 10/2002 | Abdelnur et al. |
| 2002/0156716 A1 | 10/2002 | Adatia |
| 2002/0156718 A1 | 10/2002 | Olsen et al. |
| 2002/0198813 A1 | 12/2002 | Patterson, Jr. et al. |
| 2003/0004858 A1 | 1/2003 | Schmitz et al. |
| 2003/0009411 A1 | 1/2003 | Ram et al. |
| 2003/0018567 A1 | 1/2003 | Flitcroft et al. |
| 2003/0018569 A1 | 1/2003 | Eisenthal et al. |
| 2003/0028462 A1 | 2/2003 | Fuhrman et al. |
| 2003/0028468 A1 | 2/2003 | Wong et al. |
| 2003/0093352 A1 | 5/2003 | Muralidhar et al. |
| 2003/0097319 A1 | 5/2003 | Moldovan et al. |
| 2003/0097325 A1 | 5/2003 | Friesen et al. |
| 2003/0115128 A1 | 6/2003 | Lange et al. |
| 2003/0139998 A1 | 7/2003 | Gilbert et al. |
| 2003/0167175 A1 | 9/2003 | Salom |
| 2003/0172026 A1 | 9/2003 | Tarrant |
| 2003/0177077 A1 | 9/2003 | Norman |
| 2003/0182220 A1 | 9/2003 | Galant |
| 2003/0208430 A1 | 11/2003 | Gershon |
| 2003/0220865 A1 | 11/2003 | Lutnick |
| 2003/0225657 A1 | 12/2003 | Whaley et al. |
| 2003/0225658 A1 | 12/2003 | Whaley |
| 2003/0236738 A1 | 12/2003 | Lange et al. |
| 2004/0019554 A1 | 1/2004 | Merold et al. |
| 2004/0024681 A1 | 2/2004 | Moore et al. |
| 2004/0030630 A1 | 2/2004 | Tilfors et al. |
| 2004/0088242 A1 | 5/2004 | Ascher et al. |
| 2004/0103050 A1 | 5/2004 | Long |
| 2004/0111358 A1 | 6/2004 | Lange et al. |
| 2004/0117284 A1 | 6/2004 | Speth |
| 2004/0133439 A1 | 7/2004 | Noetzold et al. |
| 2004/0158520 A1 | 8/2004 | Noh |
| 2004/0199450 A1 | 10/2004 | Johnston et al. |
| 2004/0215538 A1 | 10/2004 | Smith et al. |
| 2004/0236636 A1 | 11/2004 | Lutnick |
| 2004/0254804 A1 * | 12/2004 | Peterffy et al. ................... 705/1 |
| 2004/0267657 A1 | 12/2004 | Hecht |
| 2005/0027643 A1 | 2/2005 | Amaitis et al. |
| 2005/0044019 A1 | 2/2005 | Novick et al. |
| 2005/0049948 A1 | 3/2005 | Fuscone |
| 2005/0097027 A1 | 5/2005 | Kavanaugh |
| 2005/0125326 A1 | 6/2005 | Nangalia et al. |
| 2005/0144104 A1 | 6/2005 | Kastel |
| 2005/0149428 A1 | 7/2005 | Gooch et al. |
| 2005/0165669 A1 | 7/2005 | Montanaro |
| 2005/0209945 A1 | 9/2005 | Ballow et al. |
| 2005/0216384 A1 | 9/2005 | Partlow et al. |
| 2005/0267833 A1 | 12/2005 | Brodersen et al. |
| 2006/0008016 A1 | 1/2006 | Balakrishnan et al. |
| 2006/0036531 A1 | 2/2006 | Jackson |
| 2006/0100949 A1 | 5/2006 | Whaley et al. |
| 2006/0106700 A1 | 5/2006 | Boren et al. |
| 2006/0106713 A1 | 5/2006 | Tilly et al. |
| 2006/0143099 A1 | 6/2006 | Partlow et al. |
| 2006/0149659 A1 | 7/2006 | Carone et al. |
| 2006/0167788 A1 | 7/2006 | Tilly et al. |
| 2006/0167789 A1 | 7/2006 | Tilly et al. |
| 2006/0224491 A1 * | 10/2006 | Pinkava .......................... 705/37 |
| 2006/0253354 A1 | 11/2006 | O'Callahan |
| 2006/0253355 A1 | 11/2006 | Shalen |
| 2006/0253359 A1 | 11/2006 | O'Callahan |
| 2006/0253367 A1 | 11/2006 | O'Callahan |
| 2006/0253368 A1 | 11/2006 | O'Callahan |
| 2006/0253369 A1 | 11/2006 | O'Callahan |
| 2006/0253370 A1 * | 11/2006 | Feuser et al. ..................... 705/37 |
| 2007/0011081 A1 | 1/2007 | Bok |
| 2007/0078740 A1 | 4/2007 | Landle et al. |
| 2007/0106585 A1 | 5/2007 | Miller |
| 2007/0112659 A1 | 5/2007 | Shalen et al. |
| 2007/0172352 A1 | 7/2007 | Chiang |
| 2007/0282758 A1 | 12/2007 | Vischer et al. |
| 2008/0059356 A1 | 3/2008 | Brodsky et al. |
| 2008/0065560 A1 | 3/2008 | Bloom |
| 2008/0120249 A1 | 5/2008 | Hiatt |

| | | | |
|---|---|---|---|
| 2008/0120250 A1 | 5/2008 | Hiatt, Jr. | |
| 2008/0154790 A1 | 6/2008 | Hiatt | |
| 2008/0183640 A1 | 7/2008 | Shalen | |
| 2008/0243676 A1 | 10/2008 | Smith | |

FOREIGN PATENT DOCUMENTS

| | | |
|---|---|---|
| WO | WO 00/28449 | 5/2000 |
| WO | WO 00/48053 | 8/2000 |
| WO | WO 00/57307 A1 | 9/2000 |
| WO | WO 00/70506 | 11/2000 |
| WO | WO 01/22263 | 3/2001 |
| WO | WO 01/22269 | 3/2001 |
| WO | WO 01/22313 | 3/2001 |
| WO | WO 01/22315 | 3/2001 |
| WO | WO 01/22332 | 3/2001 |
| WO | WO 01/88808 | 11/2001 |
| WO | WO 02/37396 A2 | 5/2002 |
| WO | WO 02/077766 A2 | 10/2002 |

OTHER PUBLICATIONS

"A tall order. (Securities and Exchange Commission takes action on two new regulations for handling stock orders)", Robert Sales, Wall Street & Technology, v15, n7, p. 41(3), Jul. 1997, ISSN: 1060-989X.*
SEC Notice, Release No. 34-51107, SR-CBOE-2004-75, Federal Register vol. 70, No. 23, dated Friday, Feb. 4, 2005, pp. 6051-6057.
PCX Plus *The Pacific Exchange*, PCX Plus Overview, Oct. 9, 2003, six pages.
The National Association of Securities Dealer, Inc. "NASD Notice to members" 00-65, Sep. 2000, 5 pages.
Special Study: Payment for Order Flow and Internalization in the Options Markets, www.sec.gov/new/studies/ordpay.htm, printed on Oct. 22, 2001, 39 pages.
Domowitz, Ian, "A taxonomy of automated trade execution systems", 12 Journal of Int'l Money and Finance, p. 607-631, dated 1993.
Evans et al. "The Effects of Electronic Trading System on Open-outcry Commodity Exchange", Social Science 410, Nov. 1998.
Wang, G. et al. "Information Transmission and Electronic Versus Open Outcry Trading Systems: An Intraday Analysis of E-Mini S&P 500 Futures, S&P 500 Index Futures and S&P 500 Cash Index", paper presented in Thailand on Dec. 3-4, 2001.
Tsang, R. "Open outcry and electronic trading in futures exchanges", Bank of Canada Review, Spring 1999, pp. 21-39.
Eind Computers Private LMTD, "Online Global Trading System for Marketplaces", brochure, 2002.
C. Danis, et al. "Alternatives to an Open Outcry Market: An Issue of Supporting Cooperation in a Competitive Situation", IBM TJ Watson Research Center, USA.
Clemens et al., "Segmentation, differentiation, and flexible pricing: Experiences with information technology and segment-tailored strategies", *Journal of Management Information Systems: JMIS*, vol. 11, No. 2, pp. 9-36, Fall 1994.
"Squeezing the poor", *Guardian*, p. 8, Feb. 11, 1997.
"La libre competencia sacude a las electricas", *Actualidad Economica*, p. 18, Sep. 30, 1996.
Souter, Gavin, "Bermuda's reinsurers eager to please", *Business Insurance*, vol. 28, No. 44, p. 77, Oct. 31, 1994.
"The Electronic Component", The Options Institute Online Learning Center, obtained at the internet address: http://www.cboe.com/LearnCenter/cboeeducation/Course_02_02/mod_02_03.html.
E. Clemons et al., "Information Technology and Screen-Based Securities Trading: Pricing the Stock and Pricing the Trade", *Management Science*, vol. 43, No. 12, Dec. 1997.
"The Pandora's Box over autoquotes; Industry Trend or Event", *Wall Street & Technology*, Section No. 3, vol. 13, p. 38; ISSN: 1060-989X, Mar. 1997.
"How is a Trade Executed—Limit Order", *Nasdaq*, dated Mar. 7, 2000, One Page.
S. Cosgrove, "Courting Retail, Institutional Customers, CBOE, AMEX Get Creative", *Knight-Ridder Financial News*, Jan. 29, 1993.
Self-Regulatory Organizations: Proposed Rule Change by the Cincinnati Stock Exchange Relating to Small Order Execution Guaranty, 1985 WL 547562; SEC Release No. 22330, Aug. 15, 1985.

A Monitoring Report on The Operation of the Cincinnati Stock Exchange National Securities Trading System, U.S. Securities and Exchanges Commission, May 1981.
A Report on The Operation of The Cincinnati Stock Exchange National Securities Trading System 1978-1981, U.S. Securities and Exchange Commission, Sep. 1982.
CBOT Press Release Entitled "Impressive Project Areg. Provides Extended Opportunity in CBOT Financial Complex", dated Jan. 1995, printed from the Internet at http://web.archive.org/web/19990429192354/finance/wat.ch/SCFOA/bulletin/_0001960.htm on Oct. 31, 2005, 3 pages.
A. Frino et al., Price and Time-Priority Versus Pro-Rata Algorithms in Electronically Traded Futures Markets: Simulation Based Performance Characteristics, Oct. 3, 1998, http://www.sirca.org.au/research/database.html (Document 1998009.pdf).
A. Frino et al., The Liquidity of Automated Exchanges: New Evidence From Germany Bund Futures, vol. 8, Journal of International Financial Markets, Institutions and Money, pp. 225-241 (1998).
Self-Regulatory Organization; Chicago Stock Exchange, Inc.; Order Approving Proposed Rule Change Creating the Chicago Match System (59 F.R. 63141) SEC Release No. 34-35030, 1994 SEC LEXIS 3863, Nov. 30, 1994.
A. Sarker et al., "Electronic Trading on Futures Exchanges," Current Issues in Economics and Finance, Federal Reserve Bank of New York, vol. 4, No. 1, Jan. 1998.
Self-Regulatory Organization; Order Approving Proposed Rule Change and Notice of Filing in Order Granting Accelerated Approval of Amendment No. 2 to the Proposed Rule Change by the Philadelphia Stock Exchange, Inc. Relating to Enhanced Specialist Participation in Parity Options Trades, SEC Release No. 34-35429, 60 F.R. 12802, Mar. 8, 1995.
CBOE Rules, CCH (1989) (Rules 6.45-8.80).
CBOE Information Circular IC 93-88 (Nov. 18, 1993).
U.S. Congress, Office of Technology Assessment, "Electronic Bulls and Bears: U.S. Securities Markets and Information Technology", OTA-CIT-469 (Washington, DC: U.S. Government Printing Office, Sep. 1990). (selected excerpts).
Self-Regulatory Organizations; Filing and Order Granting Accelerated Approval of Proposed Rule Change by the Chicago Board Options Exchange, Inc., Relating to System Modifications to the Retail Automated Execution System, SEC Release No. 34-32879, vol. 58, No. 182, Sep. 22, 1993, 49342-49343.
CBOE Regulatory Circular RG 91-71, Dec. 25, 1991.
Notice of Receipt of Plan Filed Pursuant to Section 11A(a)(3)(B) of the Securities Exchange Act of 1934, 1980 WL 29398, SEC Release No. 34-16519, Jan. 22, 1980, 7 pages.
New York Stock Exchange Constitution and Rules (Commerce Clearing House, Inc. New York Stock Exchange Guide) Jul. 15, 1965, pp. 2644-2645; 2682-2683.
R. Teweles et al., The Stock Market, Fifth Edition, John Wiley & Sons, 1987, pp. 176-181.
J. Meeker, The Work of the Stock Exchange, The Ronald Press Company 1923, pp. 108-109.
CBOE Information Circular IC91-15, Feb. 25, 1991.
"smartRay.com Delivers Stock Quotes and Financial Information to Wireless Devices for Free !", PR Newswire, p. 2870, Dec. 16, 1999.
Glen, Jack D., "Trading and information systems in two emerging stock markets", East Asian Executive Reports, vol. 16 No, 12, pp. 8, 14, Dec. 15, 1994.
Michaels, Jenna, "NASD'S Global Fumble", All Street & Technology, vol. 9 No. 11, pp. 5762, Jul. 1992.
"PHLX Files Rule Changes to Improve Handling Orders on Pace", Securities Week, p. 5, Jul. 17, 1989.
"NYSE Votes to Restrict Computerized Trading", San Jose Mercury News, Feb. 5, 1988.
SEC Notice, Release No. 34-47959, SR-CBOE-2002-05, Federal Register vol. 68, No. 110, dated Monday, Jun. 9, 2003, pp. 34441-34448.
Original Rule Filing and Amendment No. 1 to SR-CBOE-2002-05, Submitted to SEC on Jan. 16, 2002, 17 pages.
Amendment No. 2 to SR-CBOW-2002-05, Submitted to SEC on May 16, 2002, 21 pages.

Amendment No. 3 to SR-CBOE-2002-05, Submitted to SEC on Jan. 15, 2003, 69 pages.

Amendment No. 4 to SR-CBOE-2002-05, Submitted to SEC on Apr. 3, 2003, 71 pages.

Amendment No. 5 to SR-CBOE-2002-05, Submitted to SEC on May 15, 2003, 3 pages.

Amendment No. 6 to SR-CBOE-2002-05, Submitted to SEC on May 30, 2003, 28 pages.

SEC Notice, Release No. 34-39086, SR-PCX-97-18, Federal Register vol. 62, No. 185, dated Wednesday, Sep. 24, 1997, pp. 50036-50048.

Angel, James J., "How Best to Supply Liquidity to a Small-Capitalization Securities Market", Georgetown University, Jul. 15, 1996, 27 pages.

SEC Notice, Release No. 34-47676, SR-CBOE-2005-05, Federal Register vol. 68 No. 77, dated Tuesday, Apr. 22, 2003, pp. 19865-19874.

Co-Pending U.S. Appl. No. 60/986,727, filed Nov. 9, 2007.

SEC Notice, Release No. 34-46803, SR-PCX-2002-36, Federal Register vol. 67 No. 222, dated Monday, Nov. 18, 2002, pp. 69580-69592.

Raithel, Tom, article titled "Major Changes Seen for Exchanges", *Evansville Courier and Press*, Apr. 12, 2000, p. B.6.

Sulima, Cheryl, "Volatitly and Variance Swaps", *Capital Markets News*, Federal Reserve Bank of Chicago, Mar. 2001.

Hull, J. and White, A., "The Valuation of Credit Default Swap Options", *Journal of Derivatives*, vol. 10, No. 3, 2003, p. 40.

Duffie, D. and Huang, M., "Swap Rates and Credit Quality", Mar. 31, 1995.

Blahnik, Mike, "Internet Opens Up Trading Frontiers", Star Tribune, Metro Edition, Minneapolis, MN, Retrieved from: http://web.archive.org/web/20040322223904/http://www.trade.com/, dated Jul. 25, 2004.

Bogomolny, Laura,: Wanna Make A Bet?, Canadian Business, Toronto, vol. 77, Iss. 21, Oct. 25 to Nov. 7, 2004.

Sodergreen, John, "Product profile: Economic Derivatives in the Energy Sector", *Futures Industry Magazine*, Jan.-Feb. 2005 issue, retrieved from http://www.futuresindustry/org/fi-magazine-home.asp?v=p&q=1018 on May 20, 2008.

Whaley, Robert. "Return and Rick of CBOE Buy Write Monthly Index", *The Journal of Derivatives*, 2002, pp. 35-42.

Chicago Board of Options Exchange, Inc. Description of the CBOE S & P 500 BuyWrite Index (BXM$^{sm}$), 5 pages, 2004.

Morgan Stanley, "Global Medium-Term Notes, series F", Registration statement No. 333-117752, Securities Commission and Exchange, 2004, pp. 22-26.

Chicago Board of Options Exchange, Inc. The New CBOE Volatility Index, 19 pages, 2003.

Vasiliki D. Skintzi, "Implied correlation index: A new measure of diversification", The Journal of Future Markets, Feb. 2005, vol. 25, Iss. 2, pp. 1-3.

U.S. Appl. No. 11/849,835, filed Sep. 4, 2007, entitled "System and Method for Creating and Trading a Derivative Investment Instrument Over a Range of Index Values", Applicant: O'Connell et al.

U.S. Appl. No. 12/112,605, filed Apr. 30, 2008, entitled "System and Method for Creating and Trading a Derivative Investment Instrument Over a Range of Index Values", Applicant: O'Connell et al.

U.S. Appl. No. 12/267,013, filed Nov. 7, 2008, entitled "Method and System for Creating a Volatility Benchmark Index", Applicant: Catherine T. Shalen.

Transitions 103, *Transitions Trading website*, retrieved using: www.archive.org Jul. 29, 2004 and Dec. 11, 2004.

Demeterfi, Kresimir, et al., "More Than You Ever Wanted to Know About Volatility Swaps," Goldman Sachs Quantitative Strategies Research Notes, Mar. 1999.

CBOE Futures Exchange letter dated May 17, 2004, to Commodity Futures Trading Commission with accompanying pages containing rules, terms, and conditions for a new product to be traded on the CBOE Futures Exchange, 8 pages.

Press Release article, "CBOE Announces Launch of Futures on VIX: First Tradable Volatility Product Will be Offered on Neew CBOE Futures Exchange," Sep. 5, 2003, two pages.

Bounds for A Volume Weighted Average Price Option, *A. W Stace*, Sep. 24, 2004.

Devore, Jay L., "Probability and Statistics for Engineering and the Sciences, Second Edition", Published 1987 by Wadsworth, Inc. pp. 13-16 and 88-96.

Margaret H. McFarland, "CBOE Rule Making: Securities and Exchange Commission (Release No. 34-47676; File No. SR-CBOE-2002-05)", 21 pgs., Apr. 14, 2003.

* cited by examiner

SYSTEM AND METHOD FOR TRADING DERIVATIVES IN PENNY INCREMENTS WHILE DISSEMINATING QUOTES FOR DERIVATIVES IN NICKEL/DIME INCREMENTS

RELATED APPLICATIONS

The present application claims the benefit of the filing date under 35 U.S.C. §119(e) of Provisional U.S. Patent Application Ser. No. 60/678,267, filed May 5, 2005, the entirety of which is hereby incorporated herein by reference.

BACKGROUND

Currently, a single trading facility such as an exchange may offer over 100,000 of its own derivative products and handle over 650 million quotes per day for all derivative products. The large number of quotes per day for derivative products causes practical problems for trading facilities to efficiently handle the large amounts of data associated with quotes.

Many of the quotes for derivative products are quotes for a small number of derivatives with similar prices. The problems associated with the large amounts of data created by quotes on derivative products will increase if the format for derivative quotes changes from the current nickel/dime increments to penny increments. Buy and sell orders for derivatives are currently offered in nickel increments for derivatives costing under $3.00 and dime increments for derivatives costing over $3.00. Investors desire the ability to submit buy and sell orders in smaller monetary increments for derivatives. However, changing the standard for derivative quotes from nickel/dime increments to penny increments will greatly increase the number of derivative quotes, and thus the amount of data that must be handled by the trading facilities. It would therefore be desirable to have a way to trade derivatives in smaller monetary increments while avoiding increased data traffic.

SUMMARY OF THE INVENTION

Accordingly, the present invention relates to a system and method for trading derivatives in penny increments while disseminating quotes for derivatives in nickel/dime increments. In a first aspect, a trading engine receives quotes for a derivative in penny increments from at least one entity. The trading engine rounds out the quotes for the derivative in penny increments to quotes for the derivative in nickel/dime increments. The quotes in nickel/dime increments are aggregated and disseminated. The trading engine receives bids and offers to take positions in the derivative based on the aggregate quotes for the derivative in nickel/dime increments and executes trades for the derivative by matching bids and offers to buy and sell positions in the derivative.

In a second aspect, a trading engine comprises a communication module, a rounding module, an aggregating module, and a dissemination quote module. The communication module receives quotes for derivative in penny increments from market participants. The rounding module receives the quote for derivatives in penny increments and rounds out the quotes to quotes for the derivative in nickel/dime increments. The aggregating module receives the quotes for the derivative in nickel/dime increments and aggregating the quotes. Finally, the dissemination quote module disseminates the aggregated quotes for the derivative in nickel/dime increments.

DETAILED DESCRIPTION OF THE PRESENTLY PREFERRED EMBODIMENTS

Figure 1:
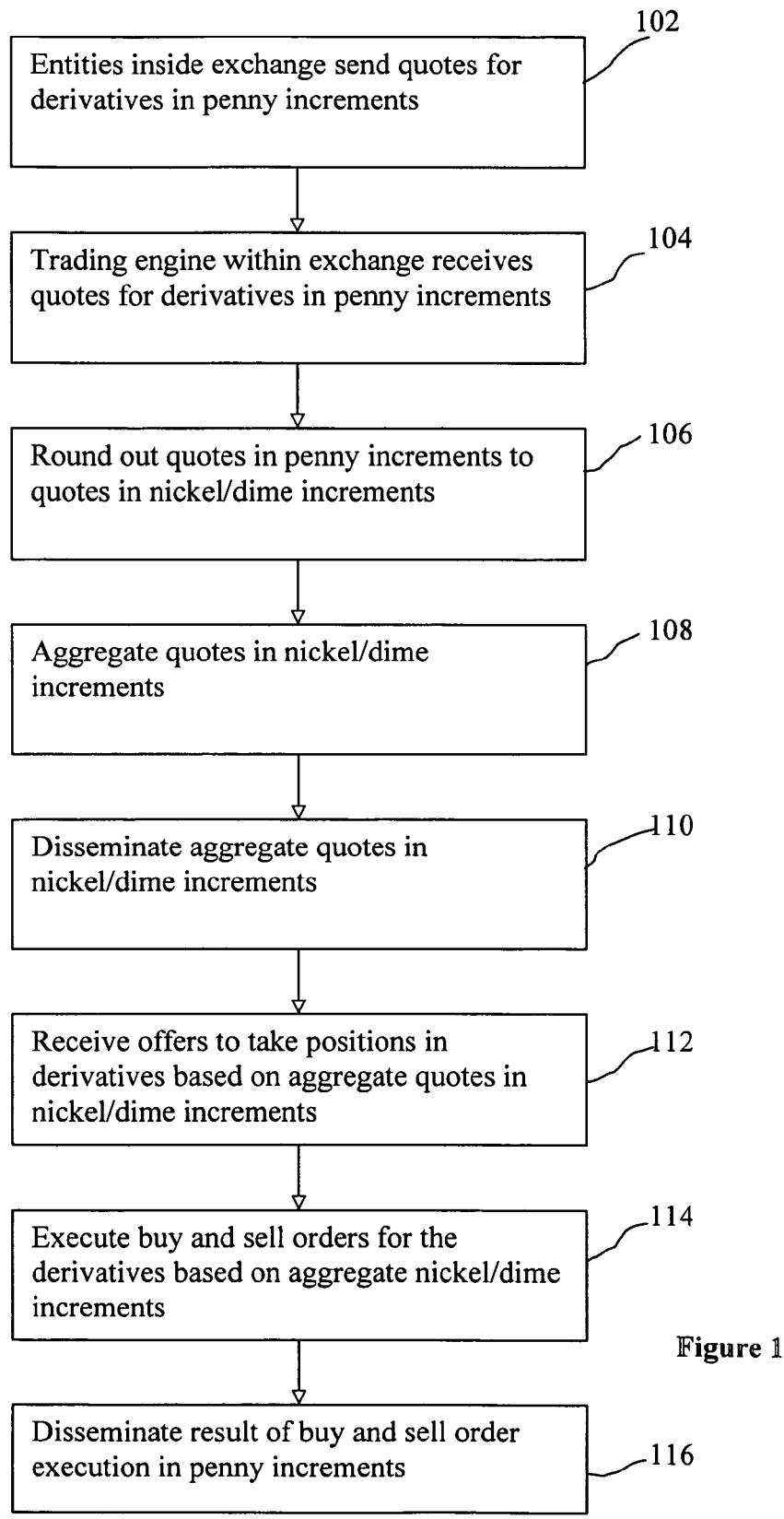
FIG. 1 is a flow chart of a method of trading derivates on an exchange in penny increments while disseminating quotes for derivatives in nickel/dime increments.

FIG. 1 shows a flow chart for one embodiment of a method of trading derivatives on an exchange in increments of hundredths of a monetary unit, such as a penny, while disseminating quotes for derivatives in increments of twentieths/tenths of a monetary unit, such as a nickel/dime. Generally, entities inside an exchange such as a broker or a market maker would be permitted to send quotes to the exchange in penny increments at 102. A trading engine within the exchange receives the quotes in penny increments at 104; rounds out the quotes in penny increments to quotes in nickel/dime increments at 106; aggregates individual quotes in nickel/dime increments at 108; disseminates the aggregate nickel/dime quotes at 110; receives offers to take positions in derivatives based on the aggregate nickel/dime quotes at 112; executes buy and sell orders for the derivatives based on the aggregate nickel/dime quotes at 114; and disseminate the result of the buy and sell order execution in penny increments at 116.

Figure 2:
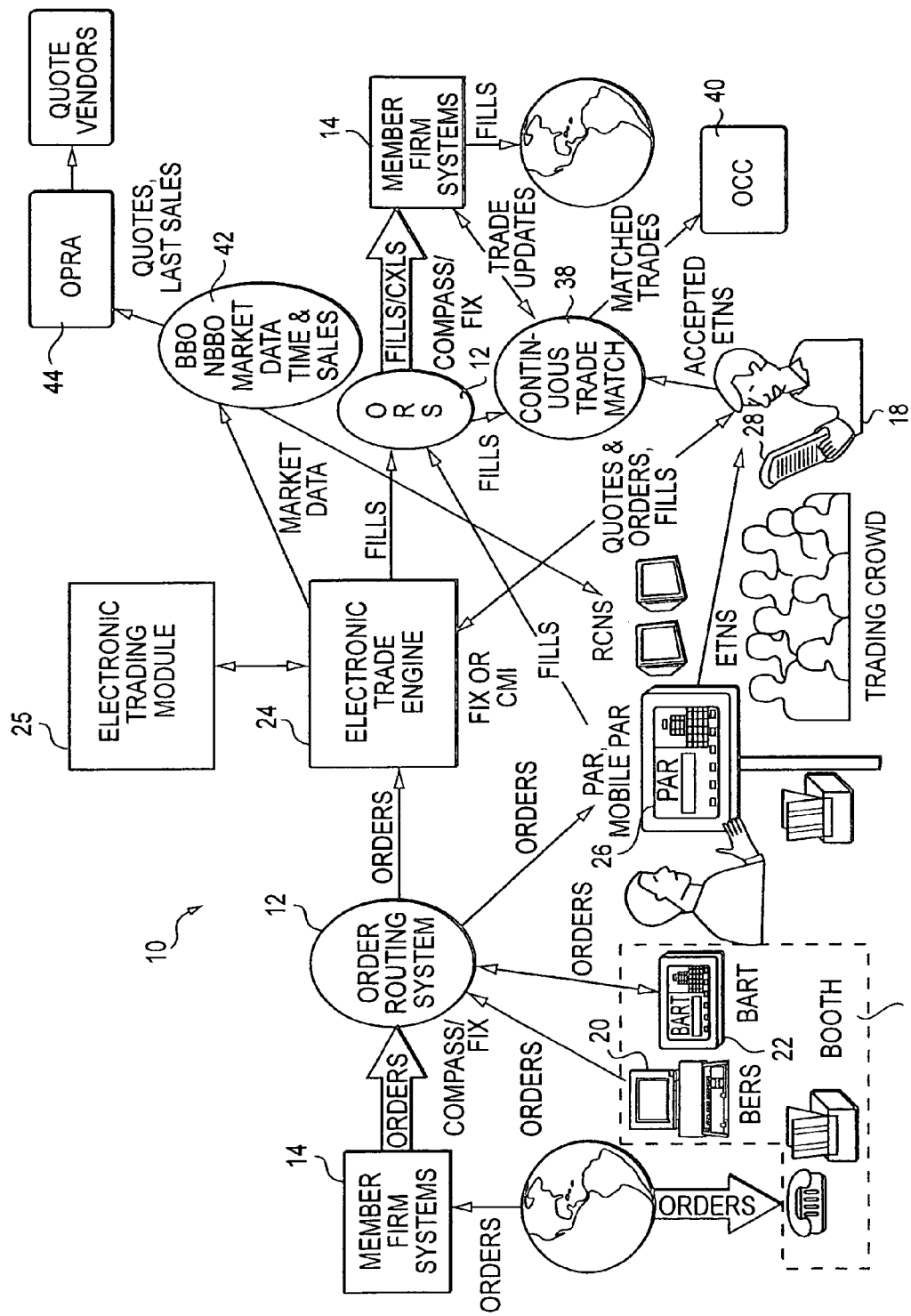
FIG. 2 is a chart of a hybrid trading system comprising a trading engine for trading derivatives in penny increments while disseminating quotes for derivatives in nickel/dime increments.

As seen in FIG. 2, the method of FIG. 1 may be implemented in an engine 25 on any system 10 implementing an electronic exchange at least in part. One example of an exchange implementing an electronic exchange at least in part as shown in FIG. 2 is the Hybrid Trading System disclosed in U.S. patent Ser. No. 10/423,201, filed Apr. 24, 2003, the entirety of which is herein incorporated by reference. The engine 25 may be hardware, software, or firmware or any other device known in the art that is hardwired or programmed to perform the method of FIG. 1, and may further include various modules for functions such as a communication, rounding, aggregating, dissemination and matching as detailed herein.

Referring again to FIG. 1, entities inside an exchange are permitted to send quotes to the exchange in penny increments at 102. Examples of entities which are inside an exchange include broker/dealers registered to trade for themselves and/or on behalf of others at the exchange, market makers who are registered to trade at the exchange and the like.

A trading engine within the exchange rounds out the quotes in penny increments to quotes in nickel/dime increments at 104. Rounding out a quote means that the price of the quote in penny increments is rounded to the nearest possible nickel/dime quote that can be executed by the exchange. For example, if a first entity registered with the exchange submits a quote for 1.01-1.04 20×20 (bid-offer bid volume×offer volume), the quote would be rounded out to 1.00-1.05 20×20. The bid at 1.01 is rounded out to 1.00 because the bid must be quoted in nickel increments, and the first registered entity is not willing to buy the derivative at 1.05. Therefore, the bid is rounded out to 1.00 because it is equal to or less than the highest price in nickel increments that the first entity is willing to pay for a derivative. The exchange will not quote a price that cannot be executed. Thus, any bid between 1.00 and 1.04 will be rounded out (down) to 1.00, any bid between 3.50 to 3.59 will be rounded out (down) to 3.50, and so on.

Similarly, the offer for 1.04 is rounded to 1.05 because the offer must be quoted in nickel increments, and the first registered entity is not willing to sell the derivative for 1.00. The exchange will not disseminate a quote that creates an offer price lower than the first entity is willing to receive for selling a derivative. Thus, any offer between 1.01 and 1.05 will be rounded out (up) to 1.05; any offer between 3.41 and 3.50 will be rounded out (up) to 3.50, and so on.

The individual quotes in nickel/dime increments are aggregated at 108. Aggregating the quotes preferably means that after the quotes from each entity have been rounded out (up or down), the quotes are summed so that they appear as one large quote. For example, if a first quote was received at 1.01-1.04 20×20 and a second quote was received at 1.01-1.03 20×20, the first quote would be rounded out to 1.00-1.05 20×20 and the second quote would be rounded out to 1.00-1.05 20×20 according to the process described above. The first and second quotes would then be aggregated so that a quote of 1.00-1.05 40×40 would then be disseminated from the exchange such that the first and second quote appear as a single larger quote.

The exchange disseminates the aggregate nickel/dime quotes at 110. The aggregate nickel/dime quotes may be disseminated over networks such as the Options Price Reporting Authority ("OPRA") or an Internet website. Accordingly, the potentially numerous penny increment quotes are reduced to an aggregate quote at the standard nickel or dime increments so that the amount of quote data transmitted to the reporting entity is maintained at a more manageable level. In one embodiment, the exchange may additionally disseminate an indicator with the aggregate nickel/dime quote to be reported over OPRA or an Internet website notifying market participants that a penny-increment quote which is better than the aggregate nickel/dime quote is available at the exchange.

The exchange receives offers to take positions in derivatives based on the aggregate nickel/dime quotes at 112 and the trading engine executes buy and sell orders for the derivatives based on the aggregate nickel/dime quotes at 114. When trades are executed, the price paid or received for a derivative are preferably those in the original (penny increment) quote and not necessarily the value in the rounded out quote. For example, if a quote is received at 1.01-1.04 20×20, the quote is rounded out to 1.00-1.05 20×20 and disseminated. If an order is received that can be traded with the bid of 20 shares at 1.00, the entity will actually trade with a better bid of 20 shares at 1.01. If an alternative order is received that can traded with the offer of 20 shares at 1.05, the order will actually be traded with a better offer of 20 shares at 1.04. In other words, an order that trades against an aggregated quote will receive the best prices/volumes of the penny increment quotes making up the aggregate quote.

In an alternative embodiment, when the trading engine executes buy and sell orders for the derivatives based on the aggregate nickel/dime quotes at 114, the trades are executed at whatever price can clear the total order regardless of whether the original quote may have had a better price. For example, if the exchange receives a first quote of 0.95-1.03 20×20, a second quote of 0.96-1.04 20×20, and a third quote of 0.97-1.05 20×20, after the three quotes are rounded out and aggregated, the exchange disseminates a quote of 0.95-1.05 60×60. If an order is received for 20 derivatives at 1.05, 20 derivatives will be sold at 1.03 of the original bid.

However, if an order is received for 40 derivatives at 1.05, all 40 derivatives will be sold for 1.04 due to the fact that 1.04 is the best price that the total order can be cleared for, even though 20 of the derivatives could have been bought at a better price of 1.03. Similarly, if an order is received for 60 derivatives at 1.05, all 60 derivatives will be sold for 1.05 due to the fact that 1.05 is the best price that the total order can be cleared for, even though 20 of the derivatives could have been bought at the better price of 1.03 and 20 of the derivatives could have been bought at the better price of 1.04.

When executing buy and sell orders for the derivatives based on the aggregate nickel/dime quotes at 114, the trading engine may also utilize trade quote locks. Trade quote locks are necessary when a bid price and an offer price from two entities within the exchange are the same and fall on a nickel/dime increment. When a trade quote lock is initiated, a delay timer is started and the trading engine prevents the entities with the locked quotes from trading with each other for a predetermined period of time. One benefit of rounding out and aggregating penny quotes is that the exchange may avoid the occurrence of quote locks at the penny increment level unless the quotes lock at the standard (nickel/dime) increment.

After executing the buy and sell orders at 114, the trading engine disseminates the result of the execution of the buy and sell orders in penny increments at 116. The trading engine may disseminate the result of the execution of the buy and sell order in penny increments over networks such as OPRA or an Internet website so that market participants may view the result of the execution in penny increments.

It will be appreciated that even though the above describes penny increments, the same method and trading engine can be used for fractional-penny increments.

It is therefore intended that the foregoing detailed description be regarded as illustrative rather than limiting, and that it be understood that it is the following claims, including all equivalents, that are intended to define the spirit and scope of this invention.

The invention claimed is:

1. A computer-implemented method for trading derivatives, the method comprising:

receiving quotes at a hardware communication module of a trading engine for a derivative in increments of hundredths of a monetary unit;

rounding out the quotes at a hardware rounding module of the trading engine from increments of hundredths of a monetary unit to increments of twentieths/tenths of the monetary unit;

disseminating, from a hardware dissemination quote module of the trading engine to one or more market makers, the quotes for the derivative in increments of twentieths/tenths of the monetary unit and an indicator that a quote which is better than the quotes for the derivative in increments of twentieth/tenths of the monetary unit is available at an exchange associated with the trading engine; and executing a trade at the trading engine for the derivative by matching bids and offers to buy and sell positions in the derivative.

2. The method of claim 1, further comprising:

aggregating the quotes for the derivative in increments of twentieths/tenths of the monetary unit; and receiving bids and offers to take positions in the derivative based on the aggregate quotes for the derivative in increments of twentieths/tenths of the monetary unit.

3. The method according to claim 1, wherein the increments of hundredths of a monetary unit are penny increments.

4. The method according to claim 1, wherein the increments of twentieths/tenths of a monetary unit are nickel/dime increments.

5. A trading engine for handling trading information in standard price increments and reduced price increments, wherein standard price increments are greater than reduced price increments, the trading engine comprising:

a hardware communication module for receiving quotes for derivatives in reduced price increments;

a hardware rounding module in communication with the communication module for receiving the quotes for derivatives in reduced price increments and rounding out the quotes in reduced price increments to quotes for the derivative in standard price increments; and a hardware dissemination quote module in communication with the rounding module to receive and disseminate to one or more market makers, the quotes for the derivative in standard price increments and an indicator that a quote which is better than the quotes for the derivative in standard price increments is available at an exchange associated with the trading engine.

6. The trading engine of claim 5, wherein the communication module is also configured for receiving bids and offers to take positions in the derivative based on the quotes for the derivative in standard price increments.

7. The trading engine of claim 5, further comprising an aggregating module in communication with the rounding module for receiving the quotes for the derivative in standard price increments and aggregating the quotes and a matching module for executing trades for the derivative by matching bids and offers to buy and sell positions in the derivative.

8. The trading engine of claim 7, wherein the matching module is configured to execute a trade for the derivative by matching a bid with a best increment offer available of the quotes received in reduced price increments that was rounded out and aggregated to create the quote for the derivative in standard price increments.

9. The method of claim 8, wherein the reduced price increments comprises a penny increment and the standard price increment comprises at least a nickel price increment.

10. The trading engine of claim 7, wherein the matching module is configured to:
   determine that a trade for the derivative executed at a best increment offer available of the quotes received in reduced price increments that was rounded out and aggregated to create the quote for the derivative in standard price increments would not clear a total order for the derivative; and
   execute a trade for the derivative at a price other than the best increment offer available of the quotes received in reduced price increments that was rounded out and aggregated to create the quote for the derivative in standard price increments in order to clear the total order for the derivative.

11. A computer-implemented method for trading derivatives, the method comprising:
   receiving quotes at a hardware communication module of a trading engine for a derivative, the quotes comprising reduced price increments, the reduced price increments comprising an increment less than a standard price increment;
   rounding out the received quotes at a hardware rounding module of the trading engine from quotes comprising prices in reduced price increments to quotes comprising prices in the standard price increments; and
   disseminating to one or more market makers, with a hardware dissemination module of the trading engine, the quotes for the derivative in standard price increments and an indicator that a quote which is better than the quotes for the derivative in standard price increments is available at an exchange associated with the trading engine.

12. The method of claim 11, further comprising:
   aggregating the quotes for the derivative in the standard price increments;
   receiving bids and offers to take positions in the derivative based on the aggregate quotes for the derivative in standard price increments; and
   executing trades for the derivative by matching bids and offers to buy and sell positions in the derivative.

13. The method of claim 12, wherein executing trades for the derivative by matching bids and offers to buy and sell positions in the derivative comprises:
   executing a trade for the derivative by matching a bid with a best increment offer available of the quotes received in reduced price increments that was rounded out and aggregated to create the quote for the derivative in standard price increments.

14. The method of claim 12, wherein executing trades for the derivative by matching bids and offers to buy and sell positions in the derivative comprises:
   determining that a trade for the derivative executed at a best increment offer available of the quotes received in reduced price increments that was rounded out and aggregated to create the quote for the derivative in standard price increments would not clear a total order for the derivative; and
   executing a trade for the derivative at a price other than the best increment offer available of the quotes received in reduced price increments that was rounded out and aggregated to create the quote for the derivative in standard price increments in order to clear the total order for the derivative.

15. A non-transitory computer readable medium comprising instructions for executing the following steps:
   receiving quotes for a derivative in increments of hundredths of a monetary unit;
   rounding out the quotes for the derivative in increments of hundredths of a monetary unit to quotes for the derivative in increments of twentieths/tenths of the monetary unit; and
   disseminating to one or more market makers, the quotes for the derivative in increments of twentieths/tenths of the monetary unit and an indicator that a quote which is better than the quotes for the derivative in increments of twentieth/tenths of the monetary unit is available at an exchange associated with the trading engine.

16. The computer readable medium according to claim 15, wherein the increments of hundredths of a monetary unit are penny increments.

17. The computer readable medium according to claim 15, wherein the increments of twentieths/tenths of a monetary unit are nickel/dime increments.

18. The computer readable medium according to claim 15 further comprising instructions for aggregating the quotes for the derivative in increments of twentieths/tenths of the monetary unit.

19. The method of claim 11, wherein the reduced price increments comprises a penny increment and the standard price increment comprises at least a nickel price increment.

20. A computer-implemented method for trading derivatives, the method comprising:
   receiving quotes for a derivative, with a hardware communication module of a trading engine, the quotes comprising reduced price increments, the reduced price increments comprising an increment less than a standard price increment;
   rounding out the received quotes, with a hardware rounding module of the trading engine, to quotes comprising prices in the standard price increments;

disseminating the quotes, with a hardware dissemination module of the trading engine, for the derivative in standard price increments;

receiving bids and offers to take positions in the derivative, with the communication module of the trading engine, based on the disseminated quotes for the derivative in standard price increments; and executing trades for the derivative, with a hardware matching module of the trading engine, by matching a bid with a best increment offer available of the quotes received in reduced price increments that was rounded out to create the quote for the derivative in standard price increments.

\* \* \* \* \*